Patented Mar. 8, 1949

2,463,939

UNITED STATES PATENT OFFICE 2,463,939

PHENYLACETYL AMINO ACID ESTERS

Otto K. Behrens, Indianapolis, Ind., assignor to Eli Lilly and Company, Indianapolis, Ind., a corporation of Indiana No Drawing. Original application August 24, 1945, Serial No. 612,524. Divided and this application August 17, 1948, Serial No. 44,799

1 Claim. (Cl. 260—471)

This is a division of application Serial No. 612,524 filed August 24, 1945.

This invention relates to a group of new organic compounds and more particularly to certain N-phenylacetyl-α-amino acids.

The new compounds provided by this invention, which comprise the N-phenylacetyl derivatives of valine, isoleucine, α-amino-n-butyric acid, β,β-diethylalanine, and nor-valine, may be represented by the following formula:

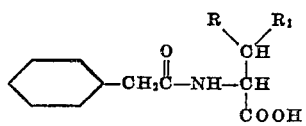

wherein R represents a member of the group consisting of hydrogen, methyl and ethyl, and $R_1$ represents methyl or ethyl.

In the above formula, when R and $R_1$ each represent methyl, the compound is N-phenylacetylvaline. When R represents ethyl and $R_1$ represents methyl, the compound is N-phenylacetylisoleucine. Additionally, when R represents hydrogen and $R_1$ represents methyl, the compound is N-phenylacetyl-α-amino-n-butyric acid. When R and $R_1$ each represent ethyl, the compound is N-phenylacetyl-β,β-diethylalanine. Furthermore, when R represents hydrogen and $R_1$ represents ethyl, the compound is N-phenylacetylnor-valine.

The compounds of this invention may be employed in the form of their free acids and also in the form of their salts such as the sodium, potassium, calcium, magnesium, ammonium, and substituted ammonium salts, as well as in the form of their lower alkyl esters such as the methyl, ethyl, and propyl esters. Such salts and esters are to be regarded as being within the scope of this invention.

Broadly speaking, the compositions of this invention may be prepared by phenylacetylating the desired α-amino acid or its lower alkyl ester with a phenylacetyl halide such as, for example, phenylacetyl chloride. The desired phenylacetylation of the acid or ester may be accomplished in the presence of an alkali salt such as sodium bicarbonate or potassium carbonate. The phenylacetylated acid may also be prepared in the presence of an alkali, for example, sodium hydroxide. The phenylacetylated ester, on the other hand, may be prepared in the absence of an alkali salt by utilizing a molar excess of the ester in the phenylacetylation reaction.

Additionally, the phenylacetylated ester may be prepared from the phenylacetylated acid by any suitable method of esterification known to the art, such as reacting the phenylacetylated acid in the presence of an alcohol and sulfuric acid.

Other methods of preparation of the compounds of this invention include the reaction of a phenylacetyl halide with the amino acid or its lower alkyl ester in the presence of a tertiary-nitrogen-containing solvent such as pyridine, quinoline, or triethylamine. Furthermore, the compounds of this invention may be prepared by treatment of the amino acid or ester with phenylacetic acid azide.

The compounds of this invention have an asymmetric carbon atom and are therefore characterized by optically active forms. In accordance with the presently preferred practice, reference to the form of the compounds as used in the specification and claims is made on the basis of the configurational relationship of the isomers to an arbitrarily chosen standard, namely, glyceric aldehyde, and is not based on observed optical rotatory power. As used herein, the letters $d$ and $l$ designate the configurations of a compound relative to the arbitrary standard and irrespective of the sign of rotation, which latter is shown by the symbol (+) for the right-handed or dextro-, and (—) for the left-handed or levorotatory power. Thus, by way of example, $l(+)$-N-phenylacetylvaline refers to the isomer which possesses the l-configuration of the molecule as determined by reference to the above-described arbitrary standard and a (+) or dextrorotatory power determinable by experimental observation.

Compounds of this invention which are characterized by the d- or l-configuration of their molecules may be prepared by methods of resolution well known to the art. Illustratively, chemical resolution may be employed, such as the preferential crystallization of a salt of the α-amino acid or phenylacetylated α-amino acid and an optically active base. Furthermore, biological resolution may be employed, for example, the destruction of one isomer of the α-amino acid by an amino acid oxidase.

As described and claimed in copending application Serial No. 612,526, filed August 24, 1945 (now Patent No. 2,440,356), compounds of this invention have been found to exhibit novel and unexpected utility in the preparation of penicillin. By way of contrast, this utility is not possessed by phenylacetylated amino acids in general. It is known, of course, that penicillin may be produced, presumably as a metabolic product, when a Penicillium mold of the *notatum-chrysogenum* group is grown in the presence of a nutrient medium and the penicillin so produced may be subsequently isolated from the mixture of mold and nutrient medium.

As disclosed in said Patent No. 2,440,356, an accelerated production and an increased yield of penicillin may be obtained by incorporating a relatively small amount of a compound of the invention in the culture medium of nutrient material in which the Penicillium mold is grown.

Illustratively, by carrying out the process of said Patent No. 2,440,356 by employing, for example, dl-N-phenylacetylvaline in a submerged culture process the concentration of penicillin produced in certain tests under comparative conditions has been substantially increased.

For the purposes of the method described and claimed in said copending application, the compounds of this invention which are characterized by the dl-form, which is a mixture of forms of the compounds exhibiting d- and l-configurations of their molecules, function satisfactorily. The l-forms of the compounds, however, are more efficient in causing the increased production of penicillin. The d-forms of the compounds when employed alone exhibit little if any activity in promoting the production of penicillin.

The following examples illustrate methods by which the compounds of this invention may be prepared:

Example 1

N-phenylacetylvaline represented by the following formula

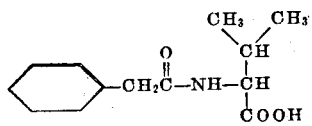

may be prepared as follows:

To a solution of 200 g. of valine in 200 cc. of water and 450 cc. of 5 N sodium hydroxide solution, there are added with stirring 293 cc. of phenylacetyl chloride while maintaining the temperature below 25° C. The addition is carried out over a period of two hours and when the bulk of the phenylacetyl chloride has been added, the reaction mixture is tested from time to time and kept alkaline by the addition of small quantities of sodium hydroxide solution. After all the phenylacetyl chloride has been added, the solution is stirred for an additional 45 minutes to complete the reaction. The reaction mixture is then filtered, acidified with about 400 cc. of 6 N hydrochloric acid solution and cooled to about 0° C. whereupon the N-phenylacetylvaline crystallizes. The crystals are filtered off, washed with cold water and dried. The N-phenylacetylvaline is suspended in one liter of 50 percent ethylene dichloride-petroleum ether mixture, stirred well, filtered and washed with an additional 500 cc. of ethylene dichloride-petroleum ether mixture. N-phenylacetylvaline thus prepared has been found to melt at about 112–114° C.; and a micro-Dumas analysis has shown the presence of 6.04 percent nitrogen as compared with a calculated value of 5.96 percent.

Example 2

N-phenylacetylvaline may also be prepared from phenylacetyl chloride and valine in the following manner:

11.7 g. of valine are dissolved in 70 cc. of pyridine, and 16.9 g. of phenylacetyl chloride are added in small portions with stirring while maintaining the temperature of the reaction below 40° C. The reaction mixture is allowed to stand at room temperature for five hours after the addition of the acid chloride has been completed. The reaction mixture is then treated with about 25 cc. of water and evaporated almost to dryness in vacuo. Another 25 cc. of water are then added and the evaporation repeated. The moist residue is suspended in about 25 cc. of water and acidified with hydrochloric acid whereupon N-phenylacetylvaline is completely precipitated from the solution. The N-phenylacetylvaline is filtered off, dried, and purified by extraction with a 50 percent ethylene dichloride-petroleum ether mixture.

Example 3

N-phenylacetylvaline additionally may be prepared from valine and phenylacetic acid azide in the following manner:

15 g. of phenylacetic acid hydrazide are dissolved and suspended in 150 cc. of water containing 3.6 g. of hydrochloric acid. The aqueous solution is layered with 50 cc. of ether and while maintained at about 0° C. is treated with an aqueous solution of 6.9 g. of sodium nitrite. During the addition of the sodium nitrite the solution is strongly agitated. The ethereal layer which contains the phenylacetic acid azide is dried with magnesium sulfate and added with vigorous stirring to a cold solution of 11.7 g. of valine dissolved in 50 cc. of 2 N sodium hydroxide solution. The reaction mixture is stirred for about two hours, the ether layer separated and discarded, and the aqueous layer acidified with hydrochloric acid. The N-phenylacetylvaline which precipitates is separated by filtration, is dried, and is purified by extraction with a 50 percent ethylene dichloride-petroleum ether mixture.

Example 4 l-(+)-N-phenylacetylvaline may be prepared in the same manner as the N-phenylacetylvaline of Example 1 except that l-valine is used as a starting material instead of dl-valine. l-(+)-N-phenylacetylvaline melts at about 139–140° C. and has about the following optical rotation in 4 percent absolute ethanol solution:

$$[\alpha]_D^{29°} = +9.5°$$

Example 5 l-(+)-N-phenylacetylvaline may also be prepared as follows, by chemical resolution by means of the brucine salt of dl-N-phenylacetylvaline prepared according to Example 1. To a solution of 23.5 g. of N-phenylacetylvaline in 50 cc. of methanol is added a solution of 46.7 g. of brucine in 100 cc. of methanol and the mixture allowed to evaporate at room temperature. The residue is dissolved in about 450 cc. of hot water and from the hot solution upon cooling there separate colorless needles of the brucine salt of l-(+)-N-phenylacetylvaline melting at about 105–108° C. This salt is recrystallized five times from water whereupon there is obtained a purified salt melting at about 105° C. and having about the following optical rotation in 2 percent absolute ethanol solution:

$$[\alpha]_D^{29.5°} = -9.0°$$

14 g. of this purified brucine salt of l-(+)-N-phenylacetylvaline are suspended in 100 cc. of water and treated with an excess of dilute sodium hydroxide solution until the mixture becomes alkaline. The precipitated brucine is filtered off and the filtrate acidified by treatment with hydrochloric acid, whereupon l-(+)-N-phenylacetylvaline precipitates. The l-(+)-N-phenylacetylvaline when recrystallized twice from dilute alcohol melts at about 139–140° C. and has about the following optical rotation in 4 percent absolute ethanol solution:

$$[\alpha]_D^{22.2°} = +9.75°$$

*Example 6*

The methyl ester of N-phenylacetylisoleucine represented by the following formula

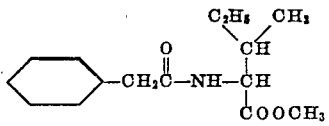

may be prepared as follows:

18 g. of isoleucine methyl ester hydrochloride are dissolved in a minimum amount of water, the solution cooled to 0° C. and several volumes of ether added. To the solution are then added 10 g. of 40 percent sodium hydroxide solution with cooling and shaking. Solid anhydrous potassium carbonate is then added until the aqueous phase is converted to a paste and separated. The aqueous paste is then extracted twice with ether, the ether extracts added to the original extract, and the combined extracts dried with anhydrous magnesium sulfate. To the dry ether solution are added 7 g. of phenylacetyl chloride in portions, and after this addition is completed, 7 g. of phenylacetyl chloride and 50 cc. of 10 per cent sodium carbonate are added in small portions. The ether layer is then washed successively with dilute hydrochloric acid solution and sodium bicarbonate solution and is dried over anhydrous magnesium sulfate. The dried ether solution freed from the magnesium sulfate upon evaporation yields the methyl ester of N-phenylacetylisoleucine.

*Example 7*

N-phenylacetyl-α-amino-n-butyric acid represented by the following formula

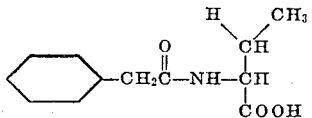

may be prepared from phenylacetyl chloride and α-aminobutyric acid by a method similar to that used for the preparation of N-phenylacetylvaline described in Example 1. N-phenylacetyl-α-amino-n-butyric acid thus prepared has been found to melt at about 124–126° C.; and a micro-Dumas analysis has shown the presence of 6.44 percent nitrogen as compared with a calculated value of 6.33 percent.

*Example 8*

N-phenylacetyl-β,β-diethylalanine represented by the following formula

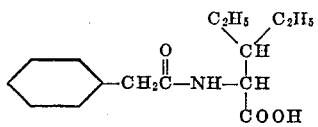

may be prepared as follows:

To a mixture of 42 g. of ammonium chloride, 31.5 g. of sodium cyanide and 120 cc. of methanol, 24.4 g. of α-ethylbutyr-aldehyde are added slowly with stirring over a period of one half hour. Stirring is continued one hour longer and the mixture is then refluxed with stirring for four hours. The solution is then cooled, 120 cc. of ether are added and the mixture filtered. To the filtrate 120 cc. of concentrated hydrochloric acid are added over a period of one hour. During this addition hydrogen cyanide is liberated. To the acidified mixture 120 cc. of water are added and the mixture evaporated to remove all of the ether and most of the water. To the residue are added 30 cc. of concentrated hydrochloric acid and the solution refluxed for 10 hours. The resulting solution after evaporation to dryness in vacuo is treated with 30 cc. of water and the evaporation in vacuo repeated. The residue is suspended in 10 cc. of water, and 150 cc. of 95 percent ethyl alcohol added, whereupon sodium chloride is precipitated and removed by filtration. 40 cc. of aniline are then added to the filtrate and the mixture cooled to about 0° C. for 10 or 12 hours. β,β-Diethylalanine precipitates from the solution in crystalline form. The crystals are purified by washing them with absolute alcohol and ether.

The β,β-diethylalanine is converted into N-phenylacetyl-β,β-diethylalanine by treatment with phenylacetyl chloride by substantially the same method used for the preparation of N-phenylacetylvaline described in Example 1. N-phenylacetyl-β,β-diethylalanine thus prepared has been found to melt at about 98–100° C.; and a micro-Dumas analysis has shown the presence of 5.6 percent nitrogen as compared with a calculated value of 5.3 percent.

*Example 9*

N-phenylacetylnor-valine represented by the formula

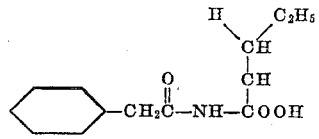

may be prepared by reacting nor-valine with phenylacetyl chloride in the presence of aqueous akali by the method used for the preparation of N-phenylacetylvaline described in Example 1.

N-phenylacetylnor-valine has been found to melt at about 136–138° C.; and a micro-Dumas analysis has shown the presence of 5.95 percent nitrogen as compared with the calculated value of 5.96 percent.

*Example 10*

N-phenylacetylisoleucine represented by the formula

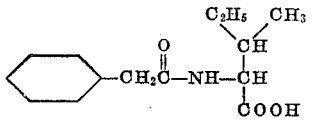

may be prepared by reacting isoleucine with phenylacetyl chloride in the presence of aqueous alkali by the method used for the preparation of N-phenylacetylvaline described in Example 1.

N-phenylacetylisoleucine has been found to melt at about 108–109° C.; and a micro-Dumas analysis has shown the presence of 5.45 percent nitrogen as compared with a calculated value of 5.62 percent.

I claim:
The methyl ester of N-phenylacetylisoleucine represented by the formula
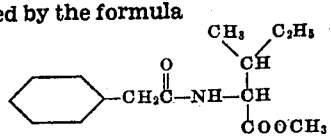
and characterized by the 1- configuration of its molecule.
OTTO K. BEHRENS.
REFERENCES CITED
The following references are of record in the file of this patent:
UNITED STATES PATENTS
| Number | Name | Date |
|---|---|---|
| 2,440,356 | Behrens | Aug. 24, 1945 |